US009384469B2

(12) United States Patent
Alkov et al.

(10) Patent No.: US 9,384,469 B2
(45) Date of Patent: Jul. 5, 2016

(54) MODIFYING ENVIRONMENTAL CHAT DISTANCE BASED ON AVATAR POPULATION DENSITY IN AN AREA OF A VIRTUAL WORLD

(75) Inventors: Christopher S. Alkov, Austin, TX (US); Travis M. Grigsby, Austin, TX (US); Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1795 days.

(21) Appl. No.: 12/234,854

(22) Filed: Sep. 22, 2008

(65) Prior Publication Data

US 2010/0077034 A1   Mar. 25, 2010

(51) Int. Cl.
*G06F 15/16* (2006.01)
*G06Q 10/10* (2012.01)
*A63F 13/30* (2014.01)

(52) U.S. Cl.
CPC .............. *G06Q 10/107* (2013.01); *A63F 13/12* (2013.01); *A63F 2300/5533* (2013.01); *A63F 2300/64* (2013.01)

(58) Field of Classification Search
USPC .................................. 709/203–206, 204–207
See application file for complete search history.

(56) References Cited

U.S. PATENT DOCUMENTS

| | | | | |
|---|---|---|---|---|
| 5,659,691 A | * | 8/1997 | Durward et al. | 715/757 |
| 5,675,721 A | * | 10/1997 | Freedman et al. | 345/502 |
| 5,736,982 A | * | 4/1998 | Suzuki et al. | 715/706 |
| 5,950,202 A | * | 9/1999 | Durward et al. | |
| 6,012,092 A | * | 1/2000 | Cuomo et al. | 709/223 |
| 6,055,563 A | | 4/2000 | Endo et al. | |
| 6,219,045 B1 | * | 4/2001 | Leahy et al. | 715/757 |
| 6,393,460 B1 | | 5/2002 | Gruen et al. | |
| RE38,287 E | * | 10/2003 | Freedman et al. | 715/848 |
| 6,665,707 B1 | | 12/2003 | Bates et al. | |
| 6,772,195 B1 | * | 8/2004 | Hatlelid et al. | 709/204 |
| 6,784,901 B1 | * | 8/2004 | Harvey et al. | 715/757 |
| 6,785,708 B1 | * | 8/2004 | Busey et al. | 709/204 |
| 6,791,549 B2 | | 9/2004 | Hubrecht et al. | |
| 6,854,012 B1 | * | 2/2005 | Taylor | 709/224 |
| 7,213,206 B2 | | 5/2007 | Fogg | |

(Continued)

OTHER PUBLICATIONS

Dede, C. N., et al., "Design-based research strategies for studying situated learning in a multi-user virutal environment", *Proceedings of the 6th international conference on Learning sciences* (18) 2, International Society of the Learning Sciences.,(2004), 158-165.

(Continued)

*Primary Examiner* — Hua Fan
(74) *Attorney, Agent, or Firm* — DeLizio Law, PLLC

(57) ABSTRACT

A mechanism for modifying a chat distance associated with an environmental chat based on the avatar population density of an area of a virtual universe associated with the environmental chat. An initial environmental chat distance may be determined based on the avatar population density, i.e., the number of avatars, in the area of the virtual universe associated with the environmental chat. The environmental chat distance may be modified in response to a change in the number of avatars in the area of the virtual universe associated with the environmental chat. The environmental chat distance may be modified such that the environmental chat distance is inversely proportional to the detected number of avatars in the virtual universe area associated with the environmental chat.

20 Claims, 7 Drawing Sheets

(56) References Cited

U.S. PATENT DOCUMENTS

| | | | |
|---|---|---|---|
| 7,293,235 B1* | 11/2007 | Powers et al. | 715/706 |
| 7,386,799 B1 | 6/2008 | Clanton et al. | |
| 7,421,660 B2 | 9/2008 | Charnock et al. | |
| 7,491,123 B2* | 2/2009 | Smith | 463/35 |
| 7,512,656 B2 | 3/2009 | Tsuchiya | |
| 7,778,948 B2 | 8/2010 | Johnson et al. | |
| 7,840,668 B1 | 11/2010 | Sylvain et al. | |
| 8,082,297 B2 | 12/2011 | Syvain | |
| 8,118,673 B2 | 2/2012 | Coleman et al. | |
| 8,182,320 B2 | 5/2012 | Coleman et al. | |
| 8,187,085 B2 | 5/2012 | Coleman et al. | |
| 2003/0177187 A1* | 9/2003 | Levine et al. | 709/205 |
| 2004/0003042 A1* | 1/2004 | Horvitz et al. | 709/204 |
| 2004/0103148 A1* | 5/2004 | Aldrich | 709/204 |
| 2004/0109023 A1 | 6/2004 | Tsuchiya | |
| 2004/0128350 A1* | 7/2004 | Topfl et al. | 709/204 |
| 2004/0162882 A1* | 8/2004 | Mora | 709/207 |
| 2004/0210634 A1* | 10/2004 | Ferrer et al. | 709/204 |
| 2005/0149622 A1* | 7/2005 | Kirkland et al. | 709/207 |
| 2005/0216558 A1* | 9/2005 | Flesch et al. | 709/205 |
| 2005/0289180 A1* | 12/2005 | Pabla et al. | 707/104.1 |
| 2006/0025214 A1 | 2/2006 | Smith | |
| 2006/0025216 A1 | 2/2006 | Smith | |
| 2006/0080130 A1* | 4/2006 | Choksi | 705/1 |
| 2007/0124704 A1 | 5/2007 | Oh | |
| 2007/0168359 A1 | 7/2007 | Jacob et al. | |
| 2007/0168863 A1 | 7/2007 | Blattner et al. | |
| 2007/0206017 A1 | 9/2007 | Johnson et al. | |
| 2007/0260984 A1 | 11/2007 | Marks et al. | |
| 2008/0147795 A1* | 6/2008 | Heidloff et al. | 709/204 |
| 2008/0234844 A1* | 9/2008 | Boustead et al. | 700/94 |
| 2008/0256452 A1 | 10/2008 | Berndt | |
| 2008/0263446 A1 | 10/2008 | Altberg et al. | |
| 2009/0125590 A1* | 5/2009 | Hayano et al. | 709/205 |
| 2009/0193078 A1* | 7/2009 | Gupta et al. | 709/204 |
| 2009/0193079 A1* | 7/2009 | Gupta et al. | 709/204 |
| 2009/0316873 A1 | 12/2009 | Lewis et al. | |
| 2010/0020955 A1 | 1/2010 | Wengrovitz | |
| 2010/0060649 A1* | 3/2010 | Haggar et al. | 345/474 |
| 2010/0077318 A1 | 3/2010 | Alkov et al. | |
| 2010/0082798 A1* | 4/2010 | Bhogal et al. | 709/224 |
| 2010/0169796 A1 | 7/2010 | Lynk et al. | |
| 2010/0262419 A1 | 10/2010 | De Bruijn et al. | |
| 2010/0304806 A1 | 12/2010 | Coleman et al. | |
| 2010/0304814 A1 | 12/2010 | Coleman et al. | |
| 2010/0304856 A1 | 12/2010 | Coleman et al. | |
| 2010/0304862 A1 | 12/2010 | Coleman et al. | |
| 2011/0047267 A1 | 2/2011 | Syvain et al. | |
| 2011/0059801 A1 | 3/2011 | Shiigi et al. | |
| 2012/0054646 A1 | 3/2012 | Hoomani et al. | |
| 2012/0059880 A1 | 3/2012 | Sylvain et al. | |
| 2012/0110479 A1 | 5/2012 | Fujisawa et al. | |
| 2013/0116044 A1 | 5/2013 | Schwartz | |

OTHER PUBLICATIONS

Greenhalgh, Chris "Implementing Multi-User Virtual Worlds (Panel Session): Ideologies and Issues", *Proceedings of the Fifth Symposium on Virtual Reality Modeling Language* (Web3d-Vrml), Monterey, California, United States, Feb. 20-24, 2000. VRML '00. ACM, New York, NY. http://doi.acm.org/10.1145/330160.330241,(2000), 149-154.

Jeffrey, P. et al., "Sharing Serendipity in the Workplace", *Proceedings of the Third international Conference on Collaborative Virtual Environments*, San Francisco, California, United States. E. Churchill and M. Reddy, Eds. CVE '00. ACM, New York, NY. http://doi.acm.org/10.1145/351006.351037,(2000), 173-179.

"Vivox: The Voice of Virtual Worlds—Integrated Voice Chat for Online Games", http://www.vivox.com/, obtained Jul. 18, 2008.

"U.S. Appl. No. 12/234,859 Office Action", Feb. 2, 2011, 22 pages.

U.S. Appl. No. 12/234,859 Final Office Action, Oct. 26, 2011, 28 pages.

U.S. Appl. No. 12/234,859 Final Office Action, Dec. 3, 2014, 26 pages.

U.S. Appl. No. 12/234,859 Office Action, May 22, 2014, 25 pages.

* cited by examiner

MODIFYING ENVIRONMENTAL CHAT DISTANCE BASED ON AVATAR POPULATION DENSITY IN AN AREA OF A VIRTUAL WORLD

BACKGROUND

Embodiments of the inventive subject matter generally relate to the field of virtual universe systems, and, more particularly, to a mechanism for modifying environmental chat distance in virtual universe systems.

Virtual universe applications allow people to socialize and interact in a virtual universe. A virtual universe ("VU") is a computer-based simulated environment intended for its residents to traverse, inhabit, and interact through the use of avatars. Many VUs are represented using 3-D graphics and landscapes, and are populated by many thousands of users, known as "residents." Other terms for VUs include metaverses and "3D Internet."

SUMMARY

Various embodiments are disclosed of a method and apparatus for modifying a chat distance associated with an environmental chat in a virtual universe. According to one embodiment, the number of avatars in an area of the virtual universe associated with the environmental chat associated with an avatar is determined. The environmental chat distance is determined based on the number of avatars in the area of the virtual universe associated with the environmental chat. The environmental chat distance is modified in response to a change in the number of avatars in the area of the virtual universe associated with the environmental chat.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to techniques for modifying an environmental chat distance in an area of a virtual universe associated with an environmental chat implemented on a client computer system, in other embodiments the techniques for modifying the environmental chat distance may be implemented on one or more virtual universe servers, or in a distributed manner across various network components, e.g., across both a client computer system and a virtual universe server. In other instances, well-known instruction instances, protocols, structures and techniques have not been shown in detail in order not to obfuscate the description.

In various embodiments, a chat distance associated with an environmental chat (or environmental chat distance) is modified based on the avatar population density of an area of the virtual universe associated with the environmental chat. In one implementation, an initial environmental chat distance is determined based on the avatar population density, i.e., the number of avatars, in the area of the virtual universe associated with the environmental chat associated with an avatar being controlled by a user. The environmental chat distance is modified in response to a change in the number of avatars in the area of the virtual universe associated with the environmental chat. For example, the detected number of avatars may change when the avatar moves to a different location within the virtual universe, or when other avatars move into or out of the virtual universe area associated with the environmental chat. The environmental chat distance may be modified such that the environmental chat distance is inversely proportional to the detected number of avatars in the virtual universe area associated with the environmental chat. In various embodiments, the environmental chat distance is modified based on an environmental chat amount detected within a time window of a predetermined amount of time in an area of the virtual universe associated with an environmental chat. The environmental chat distance may be modified such that the environmental chat distance is inversely proportional to the detected environmental chat amount within the time window.

Figure 1:
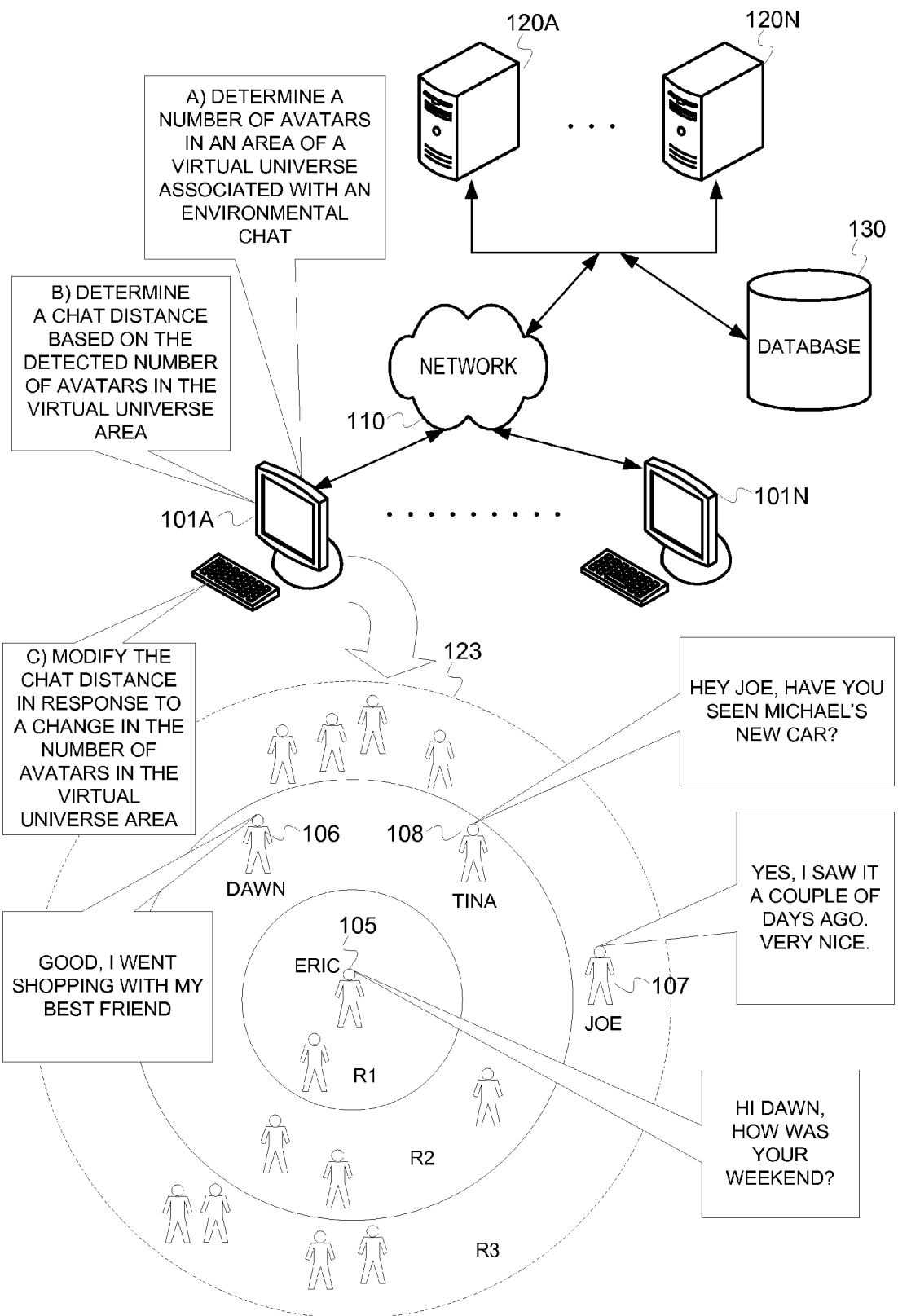
FIG. 1 conceptually depicts an example virtual universe system including a perspective of a virtual universe area associated with an environmental chat rendered at a client computer illustrating a technique for modifying an environmental chat distance.

FIG. 1 conceptually depicts an example virtual universe system that implements a technique for modifying an environmental chat distance associated with an environmental chat in a virtual universe. The system includes a plurality of client computers 101A-N (hereinafter "client computers 101"), a network 110 (e.g. the Internet), a plurality of virtual universe servers 120A-N (hereinafter "virtual universe servers 120"), and a virtual universe database 130. A user of the client computer 101A can access the virtual universe via the network 110 to perform activities in the virtual universe environment with an avatar 105. The user or "resident" of the virtual universe may be a person, group of people, or organization that controls at least one avatar and may own virtual land within the virtual universe. The user may use the avatar to traverse various regions within the virtual universe, inhabit a region, and interact with the environment and other avatars for social or business purposes, e.g., chat with other avatars at a virtual universe coffee shop or buy virtual clothing at a virtual universe shopping center. A virtual universe region is defined as an area (e.g., land, air, and/or water) within the virtual universe, typically supported by one or more virtual universe servers. In the example illustrated with FIG. 1, each virtual universe server 120 may host one or more regions. Avatars can move within regions by walking, swimming, or flying, and across regions by teleporting from one region to another. It is noted, however, that avatars can move in many different ways (e.g., teleporting within regions, running, gliding, etc.).

A perspective 123 of the virtual universe rendered at the client computer 101A depicts the avatar 105 chatting with other avatars within a region of the virtual universe, e.g., hosted by virtual universe server 120A. As illustrated, in one example, the avatar 105 is chatting with avatar 106. The client computer 101A associated with avatar 105 also displays a conversation between avatar 107 and avatar 108. In this example, since the avatars are participating in environmental text and/or voice chat, the user controlling the avatar 105 can see and/or hear conversations between other avatars located in the surrounding virtual universe area, e.g., avatar 107 chatting with avatar 108. An environmental chat is a type of chat in which the user controlling an avatar (e.g., avatar 105) sees and/or hears the conversations between other avatars that take place within a certain distance from the avatar, i.e., an environmental chat distance. Similarly, the users controlling the other avatars can see and/or hear the interactions between certain avatars, e.g., the user controlling avatar 106 can see and/or hear the conversations between avatars that take place within a certain distance from the avatar 106. In other words, rather than being a chat that is associated with a particular channel or a private chat session, environmental chat is a type of chat that displays and/or broadcasts various independent conversations taking place between various avatars within an area of the virtual universe to simulate aspects of the real world. It is noted that the environmental chat may be an environmental text chat, an environmental voice chat, or both an environmental voice and text chat.

In one implementation, at stage A, the client computer 101A determines a number of avatars in an area of the virtual universe associated with the environmental chat associated with an avatar being controlled by a user (e.g., avatar 105). For example, the client computer 101A may determine that 16 avatars (including avatar 105) are within the virtual universe area associated with the environmental chat. It is noted that the virtual universe area associated with the environmental chat is the virtual universe area that is displayed on the client computer 101A associated with the avatar 105 (e.g., via a web browser). Therefore, the virtual universe area associated with the environmental chat changes when the avatar 105 moves from one virtual location to another. In the example shown in FIG. 1, the virtual universe area associated with the environmental chat is the area having a radius of R3 virtual feet in all directions (i.e., 360 degrees) from the avatar 105. It is noted, however, that in other implementations the virtual universe area associated with the environmental chat may be different, e.g., as described below with reference to FIGS. 2A and 2B.

At stage B, the client computer 101A determines the environmental chat distance based on the number of avatars in the area of the virtual universe associated with the environmental chat. In other words, the client computer 101A determines an initial environmental chat distance based on the avatar population density within a starting virtual universe area associated with the environmental chat. In one implementation, the environmental chat distance is inversely proportional to the number of avatars in the area of the virtual universe. For example, in the perspective 123, the client computer 101A may select a first environmental chat distance of R3 (e.g., 90 virtual feet) when the determined number of avatars is within a first range of number of avatars (e.g., 1-20 avatars), select a second environmental chat distance of R2 (e.g., 60 virtual feet) when the determined number of avatars is within a second range of number of avatars (e.g., 21-30 avatars), or select a third environmental chat distance of R1 (e.g., 30 virtual feet) when the determined number of avatars is within a third range of number of avatars (e.g., 31-40+ avatars). It is noted, however, that in other implementations various predetermined number of environmental chat distances corresponding to various ranges of number of avatars may be associated with the virtual universe area associated with the environmental chat. Furthermore, it is noted that the environmental chat distance may be determined by other methods, e.g., as will be described further below with reference to FIG. 5.

At stage C, the client computer 101A modifies the environmental chat distance in response to a change in the number of avatars in the area of the virtual universe associated with the environmental chat. For instance, when the avatar 105 moves to a different location within the virtual universe or when other avatars move into or out of the virtual universe area associated with the environmental chat, the number of avatars in the virtual universe area may increase or decrease and therefore the environmental chat distance may be changed, as will be further described below with reference to FIG. 3. In one example, when the avatar 105 enters a densely populated virtual universe area, the environmental chat distance is reduced to decrease the number of avatars within the environmental chat distance. This may reduce the number of avatar conversation presented within the environmental chat associated with the avatar 105. In another example, when the avatar 105 enters a sparsely populated virtual universe area, the environmental chat distance is increased, which may increase the number of avatar conversation presented within the environmental chat associated with the avatar 105.

It is noted that the mechanism described for determining and modifying the environmental chat distance in the virtual universe area associated with the environmental chat can be implemented within each of the client device(s) 101, within one or more virtual universe servers 120, or in a distributed manner across various network components, e.g., across both the client device 101A and the virtual universe server 120A. It is noted that the Figures illustrate a bird's eye view of the virtual universe area associated with the environmental chat for simplicity; however, the virtual universe area associated with the environmental chat may be displayed on the client computer in a variety of predefined and/or user selectable views, for example, bird's eye view, street-level view, or a hybrid view.

Figure 2A:
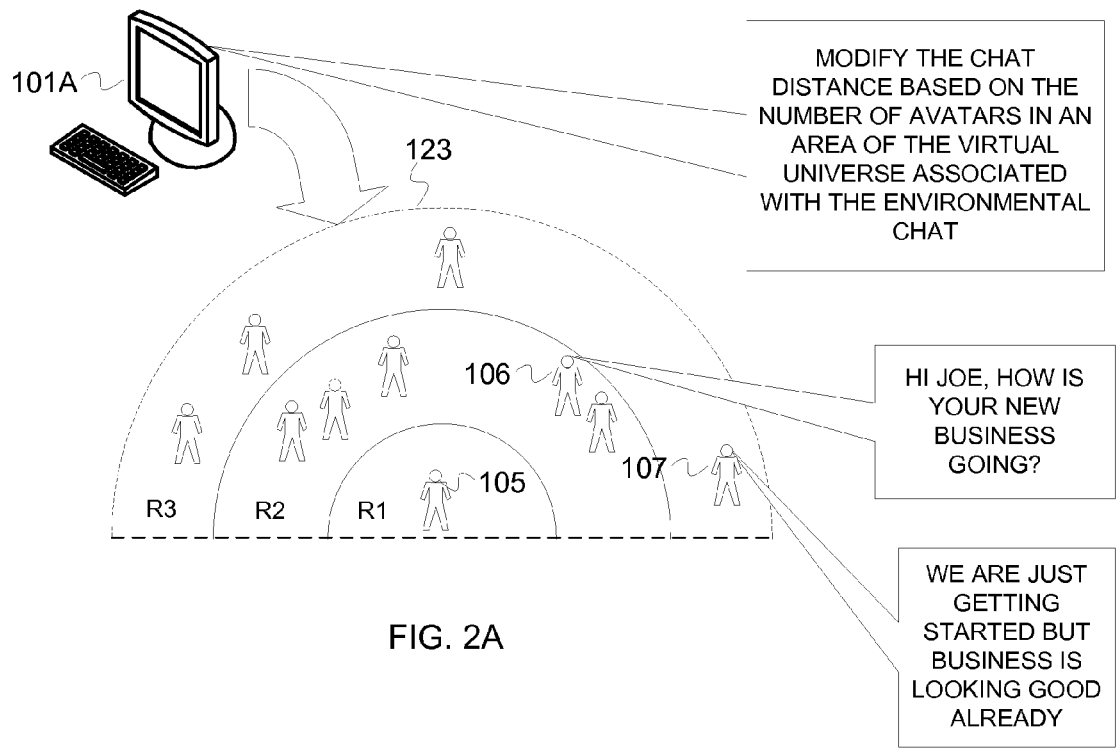
FIG. 2A conceptually depicts another example of a perspective of a virtual universe area associated with an environmental chat rendered at a client computer illustrating a technique for modifying an environmental chat distance.
Figure 2B:
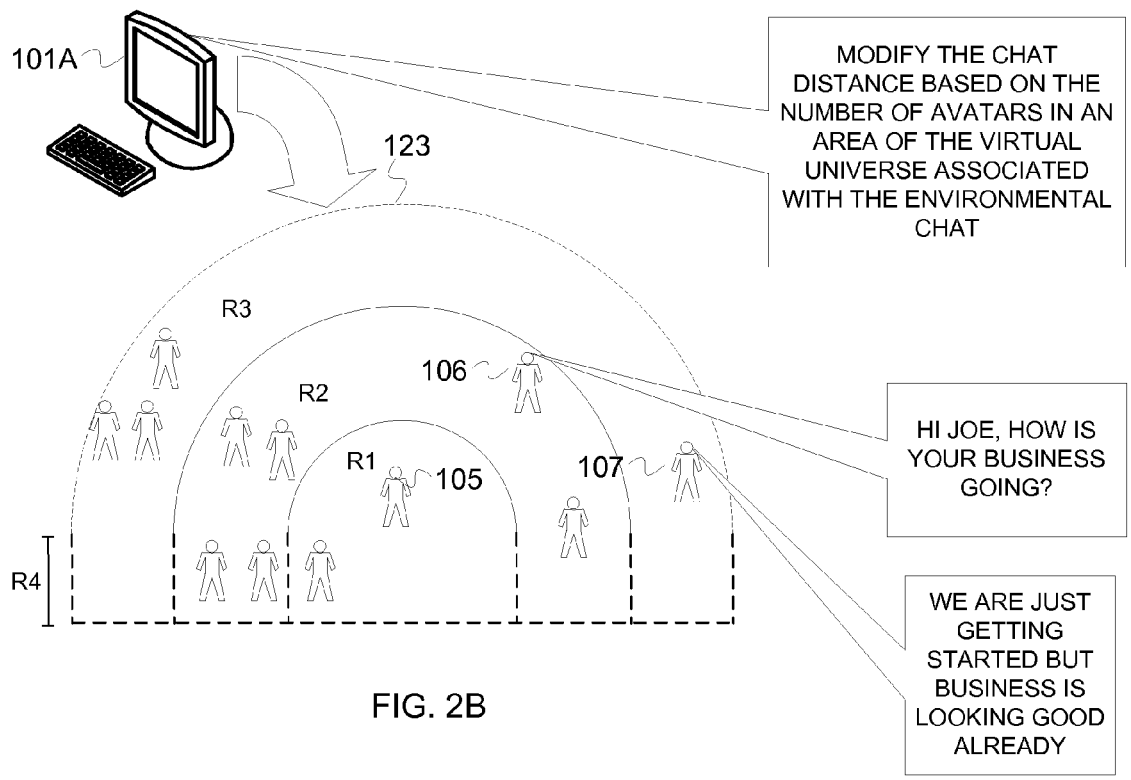
FIG. 2B conceptually depicts an additional example of a perspective of a virtual universe area associated with an environmental chat rendered at a client computer illustrating a technique for modifying an environmental chat distance.

In the example of FIG. 1, the virtual universe area associated with the environmental chat, which is displayed on the client computer 101A, is the virtual universe area with radius R3 virtual feet in all directions (i.e., 360 degrees) from the avatar 105. As described above, in this example, the environmental chat distance associated with the environmental chat may be a distance of R1, R2, or R3 virtual feet depending on the number of avatars detected within the virtual universe area. It is noted, however, that in some implementations the virtual universe area associated with the environmental chat is an area with radius R3 virtual feet that is a fraction of the area show on FIG. 1. For instance, as shown in the example of FIG. 2A, the virtual universe area may span R3 virtual feet, 180 degrees from the avatars 105. It is further noted that in other implementations the virtual universe area associated with the environmental chat may span R3 virtual feet, 180 degrees from the avatars 105, and a fixed number of feet R4 the other 180 degrees, as shown in the example of FIG. 2B. For instance, the virtual universe area may span 90 virtual feet, 180 degrees from the avatars 105, and a fixed 10 virtual feet the other 180 degrees. In this example, the R3 virtual feet may be modified based on the detected number of avatars in the virtual universe area, as was described above, but the fixed number of feet R4 spanning the other 180 degrees from the avatar 105 may remain constant regardless of the number of avatars detected in the virtual universe area.

Figure 3:
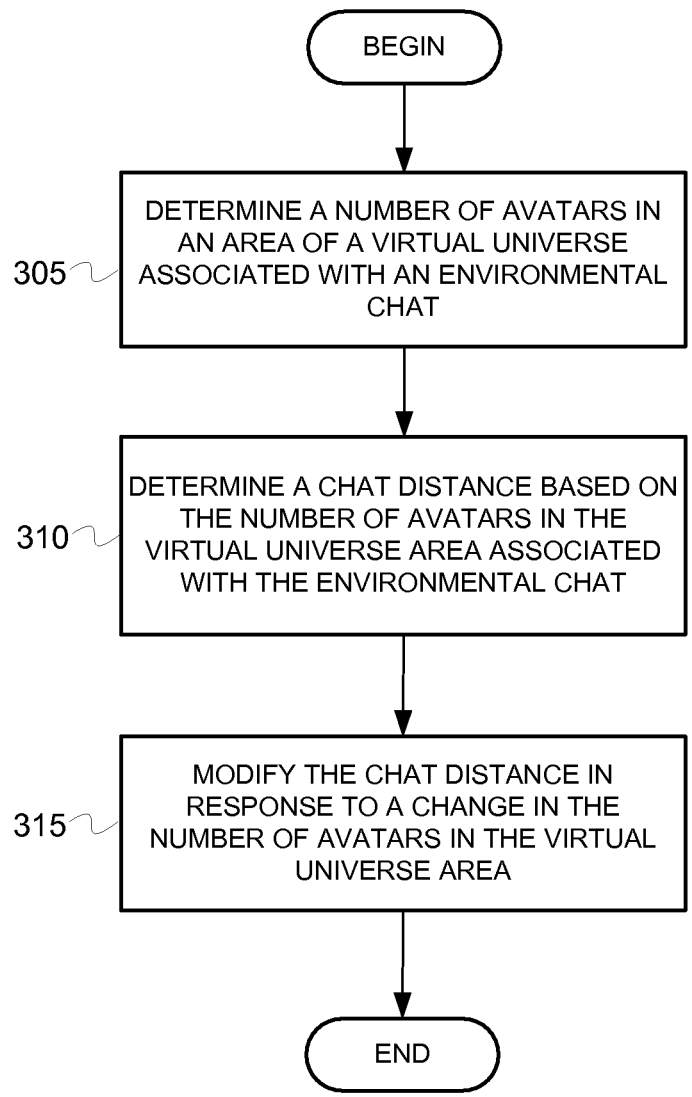
FIG. 3 depicts an example flow diagram of a method for modifying environmental chat distance based on a number of avatars in an area of the virtual universe associated with an environmental chat.

FIG. 3 depicts an example flow diagram of a method for modifying environmental chat distance based on a number of avatars in an area of the virtual universe associated with an environmental chat. At block 305, the number of avatars in the area of the virtual universe associated with the environmental chat associated with an avatar (e.g., avatar 105) is determined. For instance, in the example shown on FIG. 1, the client computer 101A may determine that 16 avatars (including avatar 105) are within the virtual universe area associated with the environmental chat. In some implementations, the client computer 101A may periodically determine the number of avatars in the virtual universe area associated with the environmental chat, for example, periodically after a programmable amount of time (e.g., every 1 or 5 minutes). The client computer may also determine the number of avatars in the virtual universe area associated with the environmental chat each time the avatar 105 moves to a new location. In some embodiments, the periodic rate at which the client computer 101A determines the number of avatars in the virtual universe area associated with the environmental chat may be automatically increases when the avatar 105 is in motion. For example, a rate of once every 60 seconds may be automatically increased to a rate of once every 15 seconds.

At block 310, an environmental chat distance is determined based on the number of avatars in the area of the virtual universe associated with the environmental chat. In one implementation, the environmental chat distance is inversely proportional to the number of avatars in the area of the virtual universe. In one example, the client computer 101A may select an environmental chat distance from a plurality of predefined environmental chat distances based on the number of avatars in the virtual universe area. In this example, a plurality of predefine ranges of number of avatars may be associated with the plurality of predefined environmental chat distances. In response to determining the number of avatars within the virtual universe area, the client computer 101A selects the predefined environmental chat distance associated with the predefined range of number of avatars corresponding to the detected number of avatars. For instance, in the example described above with reference to FIG. 1, if 16 avatars are detected within the virtual universe area, this corresponds to the first predefined range of number of avatars (e.g., 1-20 avatars), and therefore the client computer 101A selects the first predefined environmental chat distance of R3 (e.g., 90 virtual feet), which is associated with the first predefined range of number of avatars. However, if 32 avatars are detected, this corresponds to the third predefined range of number of avatars (e.g., 31-40+ avatars), and therefore the client computer 101A selects the third predefined environmental chat distance of R1 (e.g., 30 virtual feet), which is associated with the third predefined range of number of avatars.

At block 315, the environmental chat distance is modified in response to a change in the number of avatars in the area of the virtual universe associated with the environmental chat. When the avatar 105 moves to a different location within the virtual universe or when other avatars move into or out of the virtual universe area associated with the environmental chat, the number of avatars in the virtual universe area may increase or decrease and therefore client computer 101A may modify the environmental chat distance. In one example, in response to the detected number of avatars changing from a first number of avatars associated with a first predefined range of number of avatars to a number of avatars associated with a second predefined range of number of avatars, the client computer 101A modifies the environmental chat distance from a first predefined environmental chat distance associated with the first predefined range of number of avatars to a second predefined environmental chant distance associated with the second predefined range of number of avatars. In this example, if the new detected number of avatars is still within the first predefined range, then the client computer 101A does not modify the environmental chat distance. It is noted that the predefined ranges of number of avatars associated with the predefined environmental chat distances may be ranges of any number of avatars wide, and some ranges may be wider than other ranges. For instance, even though the example shown in FIG. 1 describes a second predefined range that is ten avatars wide (i.e., 21-30 avatars), in other examples the second predetermined range may be two avatars, five avatars, or thirty avatars wide.

It should be understood that the depicted flowchart of FIG. 3 is an example meant to aid in understanding embodiments and should not be used to limit embodiments or limit scope of the claims. Embodiments may perform additional operations, fewer operations, operations in a different order, operations in parallel, and some operations differently. For instance, in some embodiments, the environmental chat distance may be modified regardless of the magnitude of the change in number of avatars in the virtual universe area. For example, the environmental chat distance may be changed even if the detected number of avatars changes by only one avatar. In this example, rather than being defined by ranges, each specific number of avatars is associated with a different environmental chat distance, and therefore the environmental chat distance is modified each time the detected number of avatars changes. Furthermore, in other embodiments, when a change in the avatar population density is detected, the environmental chat distance (e.g., measured in virtual feet) may be changed a greater amount in some sections of the virtual universe area associated with the environmental chat compared to other sections, as long as it results in a desired environmental chat area (e.g., measured in squared virtual feet) associated with the environmental chat.

Figure 4A:
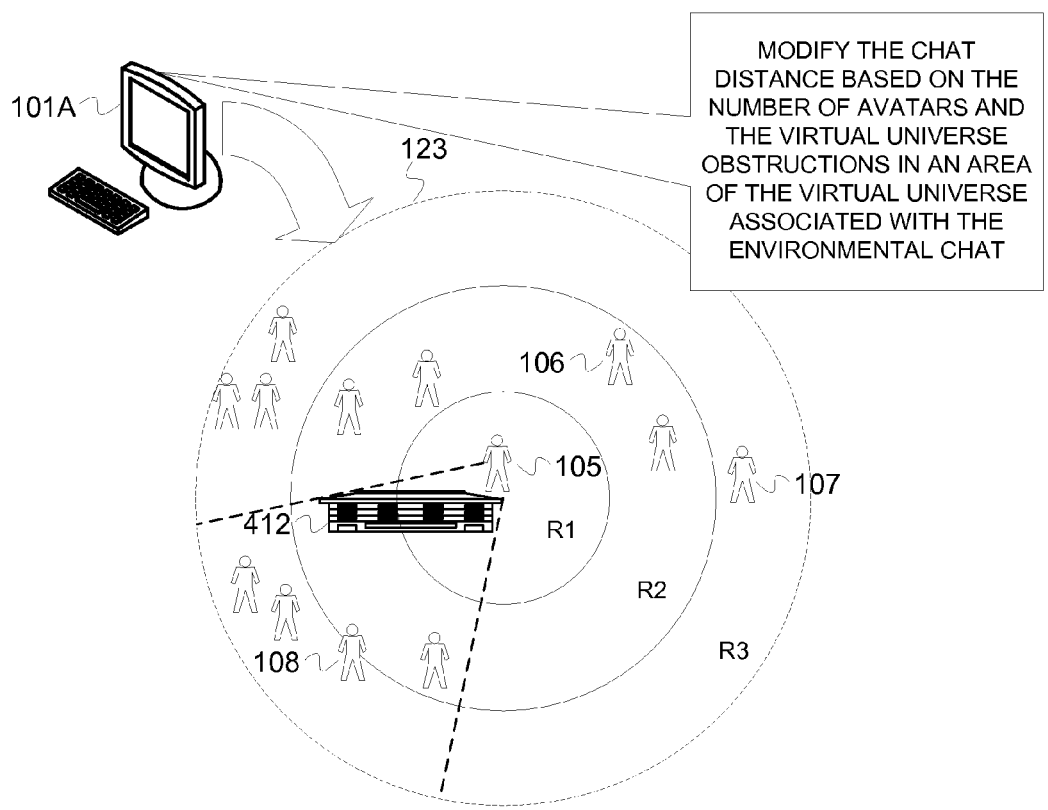
FIG. 4A conceptually depicts an example of a perspective of a virtual universe area associated with an environmental chat rendered at a client computer illustrating a technique for modifying an environmental chat distance based on a detected number of avatars and a virtual universe obstruction.
Figure 4B:
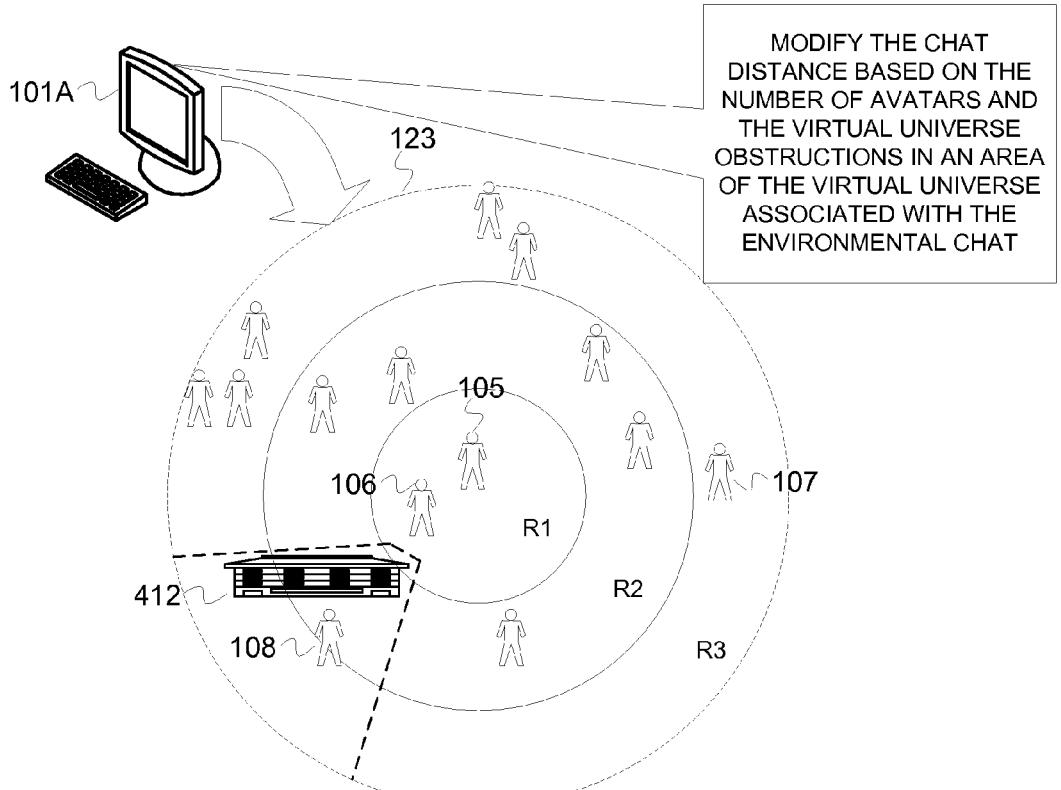
FIG. 4B conceptually depicts another example of a perspective of a virtual universe area associated with an environmental chat rendered at a client computer illustrating a technique for modifying an environmental chat distance based on a detected number of avatars and a virtual universe obstruction.

In various implementations, the environmental chat distance may be modified based on virtual universe obstructions in addition to the detected number of avatars within the virtual universe area. Some examples of virtual universe obstructions are virtual universe walls, buildings, and other structures that "block" the conversations of the avatars on the other side of the virtual universe obstruction from the environmental chat associated with the avatar 105, in order to simulate aspects of the real world. For instance, as shown in the example of FIG. 4A, when the avatar 105 is next to a virtual universe obstruction 412 (e.g., a house), the environmental chat distance may be significantly reduced for the section of the virtual universe area affected by the virtual universe obstruction 412 based on how close the avatar 105 is to the virtual universe obstruction 412. In other words, the environmental chat distance is modified for the section of the virtual universe area having the virtual universe obstruction 412 and also the area behind the virtual universe obstruction 412 (from the perspective of the avatar 105). In the example shown on FIG. 4A, if the environmental chat distance is set at 90 virtual feet, the environmental chat distance for the section of the virtual universe area affected by the virtual universe obstruction 412 may be modified to 0 virtual feet or 5 virtual feet. Therefore, the avatar 105 would not be able to see and/or hear the conversations associated with the avatar 108, since the avatar 108 is behind the virtual universe obstruction 412. The environmental chat distance of 90 virtual feet may be maintained for the rest of the virtual universe area not affected by the virtual universe obstruction 412, unless the detected number of avatars changes. In the example shown in FIG. 4B, since the virtual universe obstruction 412 is about 25 virtual feet from the avatar 105, the environmental chat distance may be reduced to 25 virtual feet for the section of the virtual universe area affected by the virtual universe obstruction 412. In this example, the avatar 105 would not be able to see and/or hear the conversations associated with the avatar 108; however, the avatar 105 would be able to see and/or hear the conversations associated with the avatar 106, since the avatar 106 is between the virtual universe obstruction 412 and the avatar 105.

Figure 5:
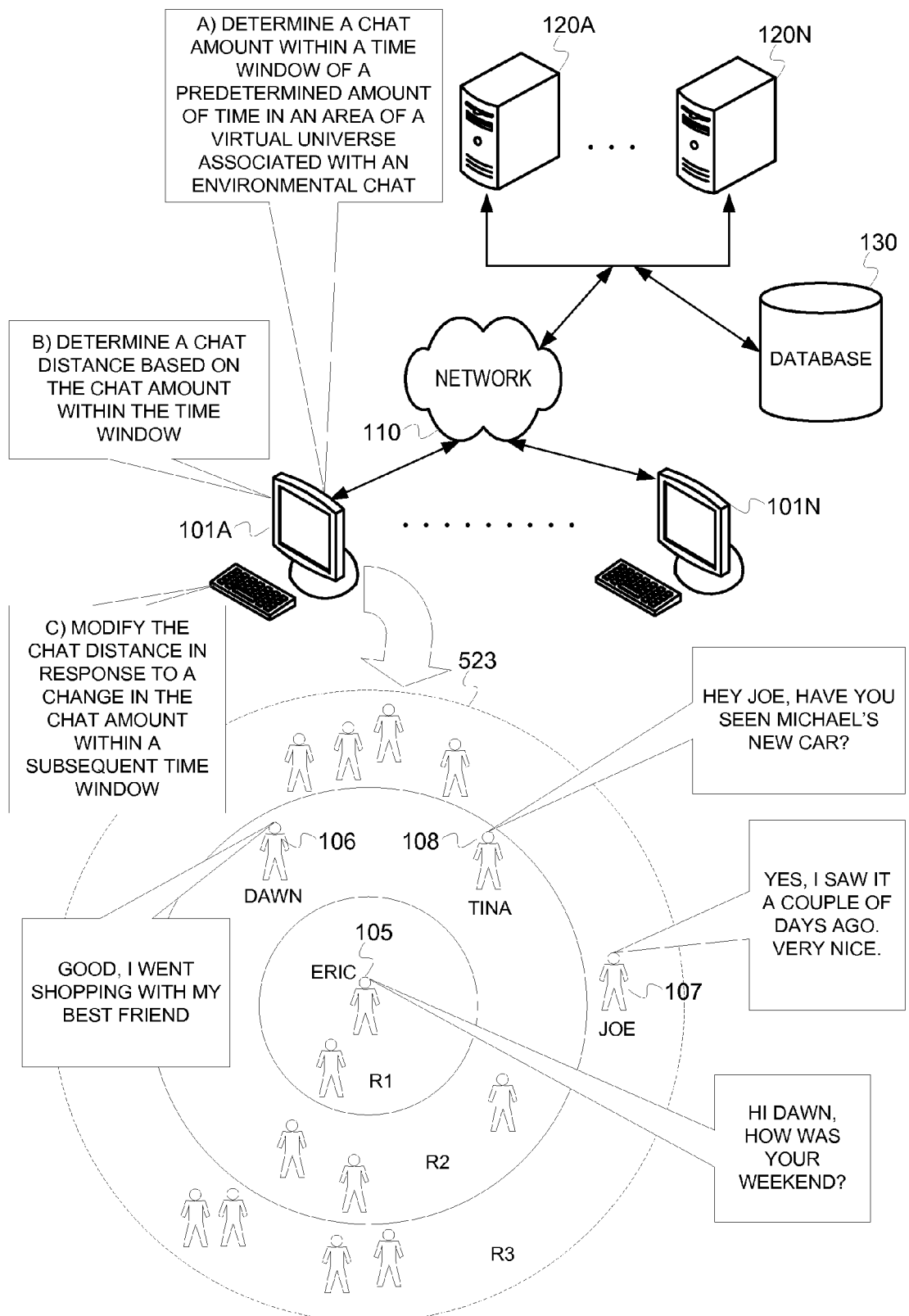
FIG. 5 conceptually depicts an example virtual universe system including a perspective of a virtual universe area associated with an environmental chat rendered at a client computer illustrating another technique for modifying an environmental chat distance.

FIG. 5 conceptually depicts an example virtual universe system that implements another technique for modifying an environmental chat distance associated with an environmental chat in a virtual universe. In FIG. 5, a perspective 523 of the virtual universe rendered at the client computer 101A depicts the avatar 105 chatting with other avatars, i.e., via environmental text and/or voice chat, within a region of the virtual universe.

In one implementation, at stage A, the client computer 101A determines an environmental chat amount within a time window of a predetermined amount of time in an area of the virtual universe associated with the environmental chat associated with an avatar being controlled by a user (e.g., avatar 105). In one example, to determine the environmental chat amount within the time window, one or more conversations between avatars within the time window are detected in the area of the virtual universe associated with the environmental chat. In this example, the environmental chat amount can be the number of words associated with the detected conversations between the avatars within the time window. For instance, in the example shown in FIG. 5, assuming the illustrated conversations are the only conversations detected within a time window of a predetermined amount of time, the client computer 101A determines that the environmental chat amount is equal to 33 words. In another example, the environmental chat amount can be the number of characters (with or without spaces) associated with the detected conversations between the avatars within the time window. For instance, in the example shown in FIG. 5, the client computer 101A determines that the environmental chat amount is equal to 130 characters (with no spaces) within a time window of a predetermined amount of time. Similar to the description of FIG. 1, the virtual universe area associated with the environmental chat shown on FIG. 5 can be the area having a radius of R3 virtual feet in all directions (i.e., 360 degrees) from the avatar 105. It is noted, however, that in other implementations the virtual universe area associated with the environmental chat may be different, e.g., as described above with reference to FIGS. 2A and 2B.

At stage B, the client computer 101A determines the environmental chat distance based on the environmental chat amount detected within the time window in the area of the virtual universe associated with the environmental chat. The client computer 101A may determine an initial environmental chat distance based on the detected environmental chat amount. In one implementation, the environmental chat distance is inversely proportional to the detected environmental chat amount. For example, with reference to the perspective 523, the client computer 101A may select a first environmental chat distance of R3 (e.g., 60 virtual feet) when the determined environmental chat amount is within a first range of environmental chat amount (e.g., 1-200 words), select a second environmental chat distance of R2 (e.g., 40 virtual feet) when the determined environmental chat amount is within a second range of environmental chat amount (e.g., 201-400 words), or select a third environmental chat distance of R1 (e.g., 20 virtual feet) when the determined environmental chat amount is within a third range of environmental chat amount (e.g., 401-600+ words). It is noted, however, that in other implementations various predetermined number of environmental chat distances corresponding to various ranges of environmental chat amounts may be associated with the virtual universe area associated with the environmental chat.

At stage C, the client computer 101A modifies the environmental chat distance in response to a change in the environmental chat amount within a subsequent time window of the predetermined amount of time in the area of the virtual universe associated with the environmental chat. In one example, when the avatar 105 moves from a virtual universe location with a relatively low environmental chat amount to a virtual universe location with a relatively high environmental chat amount, the environmental chat distance is reduced to decrease the environmental chat amount within the virtual universe area associated with the environmental chat. In another example, when the avatar 105 moves from a virtual universe location with a relatively high environmental chat amount to a virtual universe location with a relatively low environmental chat amount, the environmental chat distance is expanded to increase the environmental chat amount within the virtual universe area associated with the environmental chat. It is noted that the predetermined amount of time associated with the initial time window and with one or more subsequent time windows may be programmable.

Figure 6:
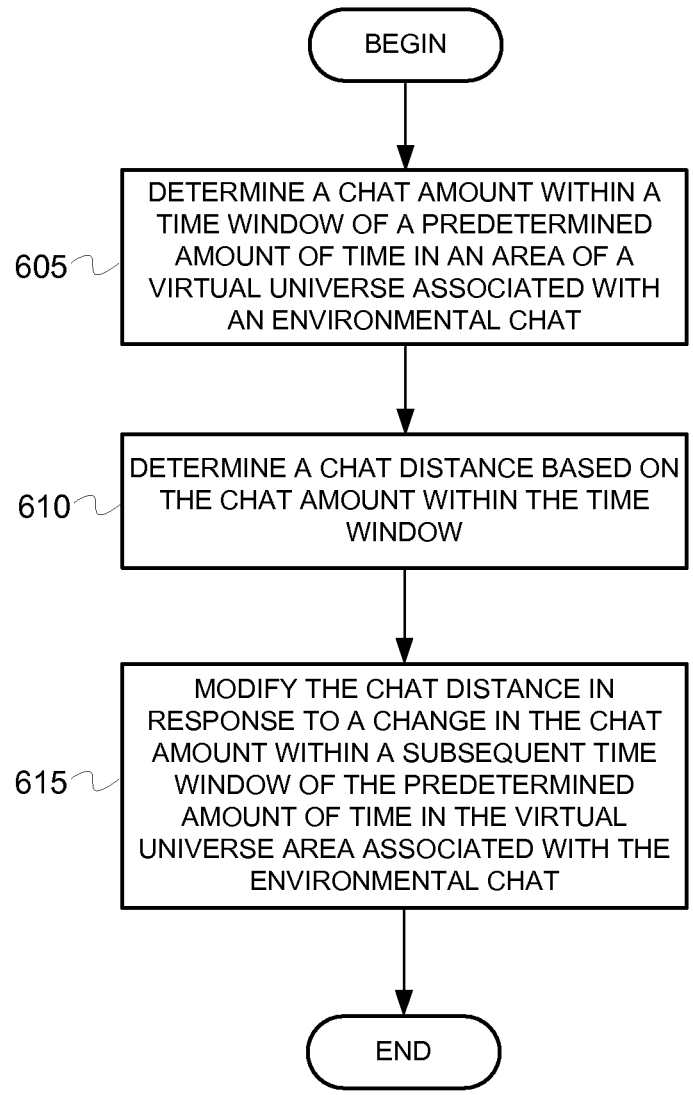
FIG. 6 depicts an example flow diagram of a method for modifying environmental chat distance based on a determined environmental chat amount within a time window of a predetermined amount of time in an area of the virtual universe associated with an environmental chat.

FIG. 6 depicts an example flow diagram of a method for modifying environmental chat distance based on a determined environmental chat amount within a time window of a predetermined amount of time in an area of the virtual universe associated with an environmental chat. At block 605, an environmental chat amount within a time window of a predetermined amount of time is determined in the area of the virtual universe associated with the environmental chat associated with an avatar being controlled by a user (e.g., avatar 105). As described above with reference to FIG. 5, the environmental chat amount can be the number of words or the number of characters (with or without spaces) associated with conversations between the avatars in an environmental text and/or voice chat detected within the time window. In one implementation, if the environmental chat is an environmental text chat, the client computer 101A may determine the environmental chat amount by counting the number of words or the number of characters associated with the conversations between avatars that are detected within the time window in the virtual universe area associated with the environmental text chat. In one example, the client computer 101A may include software that identifies and counts each word by detecting the spaces that separate each of the words. In another implementation, if the environmental chat is an environmental voice chat, the client computer 101A may include software that identifies and counts each word by detecting the pauses that separate each of the words.

At block 610, an environmental chat distance is determined based on the environmental chat amount detected within the time window in the area of the virtual universe associated with the environmental chat. In one implementation, the environmental chat distance is inversely proportional to the environmental chat amount detected within a time window. In one example, the client computer 101A may select an environmental chat distance from a plurality of predefined environmental chat distances based on the environmental chat amount detected within the time window. In this example, a plurality of predefine ranges of environmental chat amounts may be associated with the plurality of predefined environmental chat distances. In response to determining the environmental chat amount within the time window, the client computer 101A selects the predefined environmental chat distance associated with the predefined range of environmental chat amounts corresponding to the detected environmental chat amount, e.g., as was described above with reference to FIG. 5.

At block 615, the environmental chat distance is modified in response to a change in the environmental chat amount within a subsequent time window of the predetermined amount of time in the area of the virtual universe associated with the environmental chat. In various implementations, after the initial time window, the client computer 101A determines the environmental chat amount within subsequent time windows of the predetermined amount of time to determine whether to modify the environmental chat distance. In one example, the subsequent time windows are consecutive time windows. In another example, the subsequent time windows are spaced apart as desired. For example, the subsequent time windows are spaced apart with constant time periods, or are spaced apart with variable time periods (e.g., dependent on when the user associated with the avatar 105 manually initiates the environmental chat amount determination process).

It should be understood that the depicted flowchart of FIG. 6 is an example meant to aid in understanding embodiments and should not be used to limit embodiments or limit scope of the claims. Embodiments may perform additional operations, fewer operations, operations in a different order, operations in parallel, and some operations differently. For instance, in some implementations, if the environmental chat includes both text and voice chat, the client computer 101A can determine the environmental chat amount (e.g., the number of words) by analyzing both the text and voice conversations between the avatars within the virtual universe area associated with the environmental chat.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, machine-readable signal medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
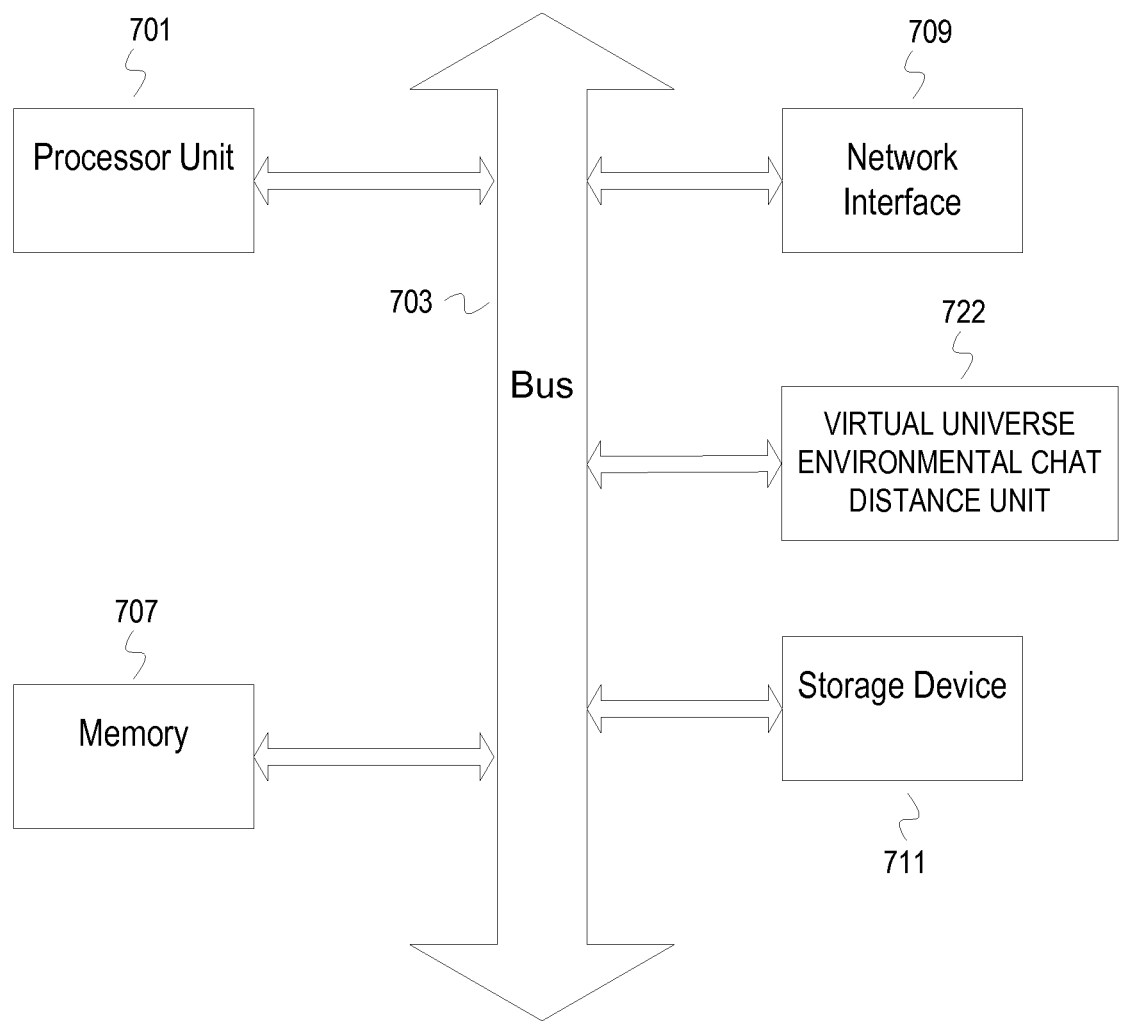
FIG. 7 depicts an example computer system.

FIG. 7 depicts an example computer system. The computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport®, InfiniBand®, NuBus, etc.), a network interface(s) 709 (e.g., an ATM interface, an Ethernet interface, a Frame Relay interface, SONET interface, wireless interface, etc.), and a storage device(s) 711 (e.g., optical storage, magnetic storage, etc.). The computer system can include a virtual universe environmental chat distance unit 722 to implement the embodiments described above with reference to FIGS. 1-6. In one implementation, the virtual universe environmental chat distance unit 722 determines and modifies an environmental chat distance based on the number of avatars that are detected within an area of the virtual universe associated with an environmental chat. In another implementation, the virtual universe environmental chat distance unit 722 determines and modifies an environmental chat distance based on the environmental chat amount that is detected within a time window of a predetermined amount of time in an area of the virtual universe associated with the environmental chat. Any one of these functionalities may be partially (or entirely) implemented in hardware and/or on the processing unit 701. For example, the functionality may be implemented with an application specific integrated circuit, in logic implemented in the processing unit 701, in a coprocessor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 711, and the network interface(s) 709 are coupled to the bus 703. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques for determining and modifying environmental chat distance based on the number of avatars that are detected within an area of a virtual universe associated with an environmental chat and/or based on the environmental chat amount that is detected within a time window of a predetermined amount of time in an area of a virtual universe associated with an environmental chat as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a server system, a number of avatars in an area of a virtual universe associated with an environmental chat associated with an avatar;
   determining, at the server system, a chat distance associated with the environmental chat associated with the avatar based on the number of avatars in the area of the virtual universe associated with the environmental chat, wherein the chat distance is inversely proportional to the number of avatars; and
   modifying, at the server system, the chat distance in response to detecting a change in the number of avatars in the area of the virtual universe associated with the environmental chat.

2. The method of claim 1, wherein the area of the virtual universe associated with the environmental chat associated with the avatar comprises the area of the virtual universe displayed on a computer system associated with the avatar.

3. The method of claim 1, wherein said determining the chat distance associated with the environmental chat associated with the avatar based on the number of avatars in the area of the virtual universe associated with the environmental chat comprises selecting the chat distance from a plurality of predefined chat distances based on the number of avatars in the area of the virtual universe associated with the environmental chat.

4. The method of claim 3, wherein,
   if the number of avatars in the area of the virtual universe associated with the environmental chat is within a first predefined range of number of avatars, selecting a first chat distance from the plurality of predefined chat distances;
   if the number of avatars in the area of the virtual universe associated with the environmental chat is within a second predefined range that is higher than the first predefined range, selecting a second chat distance that is less than the first chat distance from the plurality of predefined chat distances; and
   if the number of avatars in the area of the virtual universe associated with the environmental chat is within a third predefined range that is higher than the second predefined range, selecting a third chat distance that is less than the second chat distance from the plurality of predefined chat distances.

5. The method of claim 1, wherein said modifying the chat distance in response to detecting the change in the number of avatars in the area of the virtual universe associated with the environmental chat comprises modifying the chat distance from a first chat distance to a second chat distance in response to detecting the change in the number of avatars in the area of the virtual universe associated with the environmental chat from a first number of avatars associated with a first range of number of avatars to a different number of avatars associated with a second range of number of avatars.

6. The method of claim 1, wherein the avatar associated with the environmental chat is controlled by a user, wherein the change in the number of avatars in the area of the virtual universe associated with the environmental chat is detected in response to the avatar, being controlled by the user, moving to a different location within the virtual universe, or in response to additional avatars moving into or out of the area of the virtual universe associated with the environmental chat.

7. The method of claim 1, further comprising:
   determining whether the area of the virtual universe associated with the environmental chat comprises an environmental chat obstruction, wherein, if the area of the virtual universe associated with the environmental chat comprises an environmental chat obstruction, modifying the chat distance associated with a subsection of the area of the virtual universe associated with the environmental chat based on a location of the environmental chat obstruction with respect to the avatar associated with the environmental chat.

8. The method of claim 1, wherein the environmental chat comprises one or more of an environmental text chat and an environmental voice chat.

9. The method of claim 1, wherein said determining the number of avatars in the area of the virtual universe associated with the environmental chat associated with the avatar comprises determining the number of avatars in the area of the virtual universe associated with the environmental chat associated with the avatar periodically at a predefined periodic rate.

10. The method of claim 9, further comprising:
    in response to determining that the avatar is in motion in the virtual universe, increasing a frequency of said periodically determining the number of avatars in the area of the virtual universe associated with the environmental chat associated with the avatar.

11. The method of claim 1, wherein said determining the number of avatars in the area of the virtual universe associated with the environmental chat associated with the avatar comprises determining the number of avatars in the area of the virtual universe associated with the environmental chat associated with the avatar each time the avatar moves from a first location to a second location in the virtual universe.

12. A method comprising:
- determining, at a server system, a number of avatars in an area of a virtual universe associated with an environmental chat associated with an avatar;
- determining, at the server system, a chat distance associated with the environmental chat associated with the avatar based on the number of avatars in the area of the virtual universe associated with the environmental chat such that the chat distance is inversely proportional to the number of avatars;
- modifying, at the server system, the chat distance in response to detecting a change in the number of avatars in the area of the virtual universe associated with the environmental chat;
- determining, at the server system, whether the area of the virtual universe associated with the environmental chat comprises an environmental chat obstruction; and
- in response to determining that the area of the virtual universe associated with the environmental chat comprises an environmental chat obstruction, modifying, at the server system, the chat distance associated with the environmental chat based on a location of the environmental chat obstruction.

13. The method of claim 12, wherein said determining the chat distance associated with the environmental chat associated with the avatar based on the number of avatars in the area of the virtual universe associated with the environmental chat such that the chat distance is inversely proportional to the number of avatars comprises selecting the chat distance from a plurality of predefined chat distances based on the number of avatars in the area of the virtual universe associated with the environmental chat such that the chat distance is inversely proportional to the number of avatars.

14. The method of claim 12, wherein said modifying the chat distance in response to detecting the change in the number of avatars in the area of the virtual universe associated with the environmental chat comprises modifying the chat distance from a first chat distance to a second chat distance in response to detecting the change in the number of avatars in the area of the virtual universe associated with the environmental chat from a first number of avatars associated with a first range of number of avatars to a different number of avatars associated with a second range of number of avatars.

15. The method of claim 12, wherein, in response to determining that the area of the virtual universe associated with the environmental chat comprises the environmental chat obstruction, modifying the chat distance associated with a subsection of the area of the virtual universe associated with the environmental chat based on the location of the environmental chat obstruction with respect to the avatar associated with the environmental chat.

16. The method of claim 12, wherein the environmental chat comprises one or more of an environmental text chat and an environmental voice chat.

17. A computer program product for implementing an environmental chat in a virtual universe, the computer program product comprising:
- a computer readable storage medium having computer readable program code embodied therewith, the computer readable program code configured to,
- determine a number of avatars in an area of the virtual universe associated with the environmental chat associated with an avatar;
- determine a chat distance associated with the environmental chat associated with the avatar based on the number of avatars in the area of the virtual universe associated with the environmental chat, wherein the chat distance is inversely proportional to the number of avatars; and
- modify the chat distance in response to detecting a change in the number of avatars in the area of the virtual universe associated with the environmental chat.

18. The computer program product of claim 17, wherein the computer readable program code configured to modify the chat distance in response to detecting the change in the number of avatars in the area of the virtual universe associated with the environmental chat comprises the computer readable program code configured to modify the chat distance from a first chat distance to a second chat distance in response to detecting the change in the number of avatars in the area of the virtual universe associated with the environmental chat from a first number of avatars associated with a first range of number of avatars to a different number of avatars associated with a second range of number of avatars.

19. A computer system comprising:
- a processor;
- a network interface coupled with the processor; and
- an environmental chat distance unit operable to,
  - determine a number of avatars in an area of a virtual universe associated with an environmental chat associated with an avatar;
  - determine a chat distance associated with the environmental chat associated with the avatar based on the number of avatars in the area of the virtual universe associated with the environmental chat, wherein the chat distance is inversely proportional to the numbeer of avatars; and
  - modify the chat distance in response to detecting a change in the number of avatars in the area of the virtual universe associated with the environmental chat.

20. The computer system of claim 19, wherein the environmental chat distance unit operable to modify the chat distance in response to detecting the change in the number of avatars in the area of the virtual universe associated with the environmental chat comprises the environmental chat distance unit operable to modify the chat distance from a first chat distance to a second chat distance in response to detecting the change in the number of avatars in the area of the virtual universe associated with the environmental chat from a first number of avatars associated with a first range of number of avatars to a different number of avatars associated with a second range of number of avatars.

* * * * *